(12) United States Patent
Kanehira et al.

(10) Patent No.: US 7,478,413 B2
(45) Date of Patent: Jan. 13, 2009

(54) OPTICAL RECORDING MEDIUM

(75) Inventors: Jun Kanehira, Kurashiki (JP); Osamu Ishizaki, Makabe-gun (JP)

(73) Assignees: Hitachi Maxell, Ltd., Ibaraki-shi (JP); Mitsubishi Kagaku Media Co., Ltd., Tokyo (JP)

(*) Notice: Subject to any disclaimer, the term of this patent is extended or adjusted under 35 U.S.C. 154(b) by 566 days.

(21) Appl. No.: 10/920,380

(22) Filed: Aug. 18, 2004

(65) Prior Publication Data

US 2005/0044559 A1 Feb. 24, 2005

(30) Foreign Application Priority Data

Aug. 22, 2003 (JP) ............... 2003-299089

(51) Int. Cl.
*G11B 7/24* (2006.01)
(52) U.S. Cl. .................................... 720/721
(58) Field of Classification Search ............... 720/721; 369/275.5
See application file for complete search history.

(56) References Cited

U.S. PATENT DOCUMENTS

| | | | | |
|---|---|---|---|---|
| 5,438,564 | A * | 8/1995 | Takahashi | 720/722 |
| 6,507,559 | B1 * | 1/2003 | Iwaki | 369/275.5 |
| 6,703,100 | B2 * | 3/2004 | Arakawa et al. | 428/64.2 |
| 6,889,381 | B2 * | 5/2005 | Kikuchi et al. | 720/718 |
| 2002/0085482 | A1 | 7/2002 | Kikuchi et al. | |
| 2003/0161255 | A1 | 8/2003 | Kikuchi et al. | |

FOREIGN PATENT DOCUMENTS

| | | | |
|---|---|---|---|
| JP | 9-161333 | | 6/1997 |
| JP | 10-283683 | | 10/1998 |
| JP | 2000322781 | A * | 11/2000 |
| JP | 2002-117584 | | 4/2002 |
| JP | 2002-123980 | | 4/2002 |
| JP | 2002-170279 | | 6/2002 |

* cited by examiner

*Primary Examiner*—Angel Castro
*Assistant Examiner*—Christopher R. Magee
(74) *Attorney, Agent, or Firm*—Oblon, Spivak, McClelland, Maier & Neustadt, P.C.

(57) ABSTRACT

An optical recording medium includes a plane ring-shaped substrate in which a center hole is opened at the center thereof, a recording-retrieving function layer and a cover layer each having an outer diameter approximately equal to that of the substrate and an inner diameter larger than an outer diameter of the center hole, are stacked on the substrate, and as a separate entity from the cover layer, a clamp portion which is for holding and fixing the substrate and which has an outer diameter smaller than inner diameters of the recording-retrieving function layer and the cover layer, is provided around the center hole in a region where the cover layer is not formed.

9 Claims, 8 Drawing Sheets

OPTICAL RECORDING MEDIUM

BACKGROUND OF THE INVENTION

1. Field of the Invention

The present invention relates to an optical recording medium. More specifically, the present invention relates to an optical recording medium in which highly reliable recording and/or retrieving of optical information signals is performed.

2. Description of the Related Art

In recent years, in order to cope with the trend toward higher recording density required for optical recording media (hereinafter also simply referred to as "disks" or "optical disks") technology for reducing the diameter of the spot of recording or retrieving light is being developed. Specifically, in the above-described technology, the diameter of the spot of recording or retrieving light is reduced by increasing the numerical aperture (NA) of an objective lens of an optical pickup. The objective lens is used for irradiating recording or retrieving light.

Moreover, in addition to increasing the NA of the objective lens, a study to thin an optically transparent layer of the optical recording medium through which the above-described recording or retrieving light passes is also being developed. If the thickness of the optically transparent layer is reduced, influences of aberration and birefringence caused by decreased tolerance of the tilt angle of a disk plane relative to the optical axis of the optical pickup are reduced.

In terms of thinning the optically transparent layer, a further study is being developed. Specifically, the layer configuration of the optical recording medium is made to be a structure in which a reflecting layer and a thin cover layer allowing recording or retrieving light to pass therethrough are sequentially stacked on a disk substrate having concavo-convex for optical information formed thereon. Further, an optical recording medium has been proposed in which, by means of the cover layer as an optically transparent layer, optical information is retrieved by irradiating retrieving light from the cover layer side. Such an optical recording medium is called a surface incident-type optical recording medium.

As a method of forming an optically transparent layer in a surface incident-type optical recording medium, a method has been proposed in which an optically transparent sheet is fixed to the surface of a substrate by use of an adhesive layer to be used as an optically transparent layer (e.g., refer to Patent Literature 1). Moreover, as a method of forming an optically transparent layer, a method has also been reported in which photocurable resin applied to the surface of a substrate by spin coating and cured to form an optically transparent layer (e.g., refer to Patent Literature 2).

On the other hand, with the development of a study to increase the NA of an objective lens, the distance (working distance) between the surface of an optical recording medium and an objective lens is reduced. This newly causes a problem. Specifically, if the optical recording medium is rotated at high speed while being held and fixed in a rotating device, the axial runout of the optical recording medium occurs. Due to the occurrence of the axial runout, recording and retrieving are prone to fail. Furthermore, since the working distance is small, the objective lens may come into contact with the surface of the optical recording medium to scratch the surface of the optical recording medium or the objective lens in the case where the axial runout is large.

As a method of reducing the influence of axial runout in a surface incident-type optical recording medium, for example, a method has been reported in which a clamp reference plane used for holding and fixing the optical recording medium in an external mechanism is provided on an optically transparent layer of the optical recording medium (e.g., refer to Patent Literature 3).

(Patent Literature 1) Japanese Unexamined Patent Publication No. Hei 10(1998)-283683 (paragraph 0013, FIG. 6, and the like)

(Patent Literature 2) Japanese Unexamined Patent Publication No. Hei 9(1997)-161333 (paragraphs 0015 to 0021, FIG. 7, and the like)

(Patent Literature 3) Japanese Unexamined Patent Publication No. 2002-117584 (paragraph 0015, FIG. 1, and the like)

Incidentally, the recording and retrieving of the aforementioned optical recording medium provided with the optically transparent layer (cover layer) are generally performed by holding and fixing a clamp portion of the optical recording medium in a rotating device (external mechanism) of a read and write tester or the like and rotating the optical recording medium. At this time, in the case where the flatness of the clamp portion is poor, the axial runout of the optical recording medium is increased by rotating the optical recording medium at high speed in a state where the optical recording medium is fixed in the rotating device. For example, in a method in which a clamp reference plane is provided in the clamp portion on the surface of the optically transparent layer (cover layer), the axial runout of the disk is tend to be determined by the quality of the flatness of the optically transparent layer (cover layer) formed on the substrate, and further improvement is considered to be necessary.

Further, in the case where the optically transparent layer (cover layer) is formed by spin coating, there is a following problem: when a center cap used for obtaining the uniformity of the coating film thickness is removed after the completion of spin coating, uncured spin-coating layer near the edge of the center cap is prone to be made nonuniform, and therefore the flatness of the clamp portion is lowered.

SUMMARY OF THE INVENTION

Thus, the present invention has been accomplished in order to solve technical problems newly occurring with the trend toward higher recording density of optical recording media.

Specifically, an object of the present invention is to provide an optical recording medium in which axial runout during high-speed rotation is low and in which highly reliable recording and/or retrieving of information signals is performed.

Moreover, another object of the present invention is to provide a method of manufacturing an optical recording medium in which axial runout during high-speed rotation is low.

In order to solve the aforementioned problems, the present invention employs a configuration in which a clamp portion is provided as a separate entity in a region different form a cover layer.

That is, an optical recording medium to which the present invention is applied includes: a substrate; a recording-retrieving function layer which is formed on the substrate and in which recording and/or retrieving of information signals is performed by using irradiated light; a cover layer formed on the recording-retrieving function layer; and a clamp portion which is provided in a region where the cover layer is not formed and which is formed directly on the substrate or on the substrate with the recording-retrieving function layer interposed therebetween.

More specifically, in the optical recording medium to which the present invention is applied, the clamp portion whose surface flatness has been improved can be provided as a separate entity from the cover layer if the optical recording medium has the following features: the substrate has a plane ring shape, the recording-retrieving function layer has an inner diameter larger than the inner diameter of the substrate, and an outer diameter smaller than an outer diameter of the substrate; the cover layer has an inner diameter smaller than the inner diameter of the recording-retrieving function layer, and an outer diameter approximately equal to the outer diameter of the substrate; and the clamp portion has an inner diameter approximately equal to the inner diameter of the substrate or an inner diameter larger than the inner diameter of the substrate, and an outer diameter approximately equal to the inner diameter of the cover layer or an outer diameter smaller than the inner diameter of the cover layer.

Here, it is preferable that the clamp portion is formed of thermoplastic resin and that the cover layer is formed of photocurable resin. Using such materials allows the effect of the present invention to be favorably exerted.

Further, in the optical recording medium to which the present invention is applied, if the step height between a surface of the clamp portion and a surface of the cover layer is within a range of ±0.05 mm, variations in the distance between the optical recording medium attached to a read and write tester (drive) and an objective lens can be minimized.

Moreover, in the optical recording medium to which the present invention is applied, it is preferable that the clamp portion has a structure having: a sheet layer which is for holding the optical recording medium and which comes into contact with an external device; and an adhesive layer for adhering the sheet layer to any one of the substrate and the recording-retrieving function layer.

In the optical recording medium to which the present invention is applied, axial runout measured on the surface of the recording-retrieving function layer, when the optical recording medium is rotated while being held and fixed by the clamp portion, can be limited to be 100 μm or less by providing the clamp portion as a separate entity from the cover layer as described above.

Moreover, in the optical recording medium to which the present invention is applied, if the cover layer is transparent to a light used for recording and/or retrieving of information signals, and the light passes through the cover layer to be irradiated to the recording-retrieving function layer, the effect of the present invention is more significantly exerted as the present invention can be applied to, for example, a surface incident-type optical recording medium.

In addition, in the optical recording medium to which the present invention is applied, the clamp portion formed of a metal plate can also be provided.

Furthermore, in the optical recording medium to which the present invention is applied, it is preferable that the substrate is provided with a center hole at a center thereof, and that the clamp portion has an inner diameter larger than a diameter of the center hole and an outer diameter smaller than an inner diameter of the cover layer. Such a structure makes it possible to functionally and independently separate the function of the clamp portion for holding and fixing the optical recording medium and the function of the cover layer allowing light irradiated to the recording-retrieving function layer to pass therethrough. Thus, the respective capabilities thereof can be exerted.

Next, the present invention is grasped as a method of manufacturing an optical recording medium. The method comprising the steps of: forming a recording-retrieving function layer on a substrate; forming a cover layer on the recording-retrieving function layer; and forming a clamp portion which is provided in a region where the cover layer is not formed, and which is formed directly on the substrate or on the substrate with the recording-retrieving function layer interposed therebetween.

In the method of manufacturing the optical recording medium to which the present invention is applied, it is preferable that, in the step of forming the cover layer, a surface of the recording-retrieving function layer is coated with a precursor of photocurable resin by spin coating, and the precursor of the photocurable resin is cured by light.

Further, in the method of manufacturing the optical recording medium to which the present invention is applied, it is preferable that, in the step of forming the clamp portion, the clamp portion having a sheet layer and an adhesive layer is adhered to a region where the cover layer is not formed.

Moreover, in the method of manufacturing the optical recording medium to which the present invention is applied, it is preferable that the cover layer is formed to allow light used for recording and/or retrieving of information signals to pass through the cover layer.

Furthermore, in the step of forming the clamp portion, it is preferable that printing material having a predetermined film thickness is printed by a printing method. Screen printing can be cited as the printing method, and the printing material is preferably any one of a polyurethane solvent-drying type and an acrylic ultraviolet-curing type. In addition, a metal plate or a plastic sheet having an outer diameter smaller than the inner diameter of the cover layer having a plane ring shape can also be used for forming the clamp portion.

According to the present invention, an optical recording medium is provided in which axial runout during high-speed rotation is reduced and in which highly reliable recording and/or retrieving of information signals is performed.

BRIEF DESCRIPTION OF THE DRAWINGS

FIG. 1A is a cross-sectional structure diagram of an optical recording medium, which is a first embodiment. FIG. 1B is a cross-sectional structure diagram of an optical recording medium, which is a second embodiment.

DESCRIPTION OF THE PREFERRED EMBODIMENT

Hereinafter, a best mode (hereinafter referred to as an embodiment) for carrying out the present invention will be described in detail, taking an example of an optical recording medium, such as a CD or a DVD, having a plane ring shape. It is noted that the present invention is not limited to the following embodiment but can be carried out by variously modifying the embodiment within the scope of the present invention.

Figure 1A:
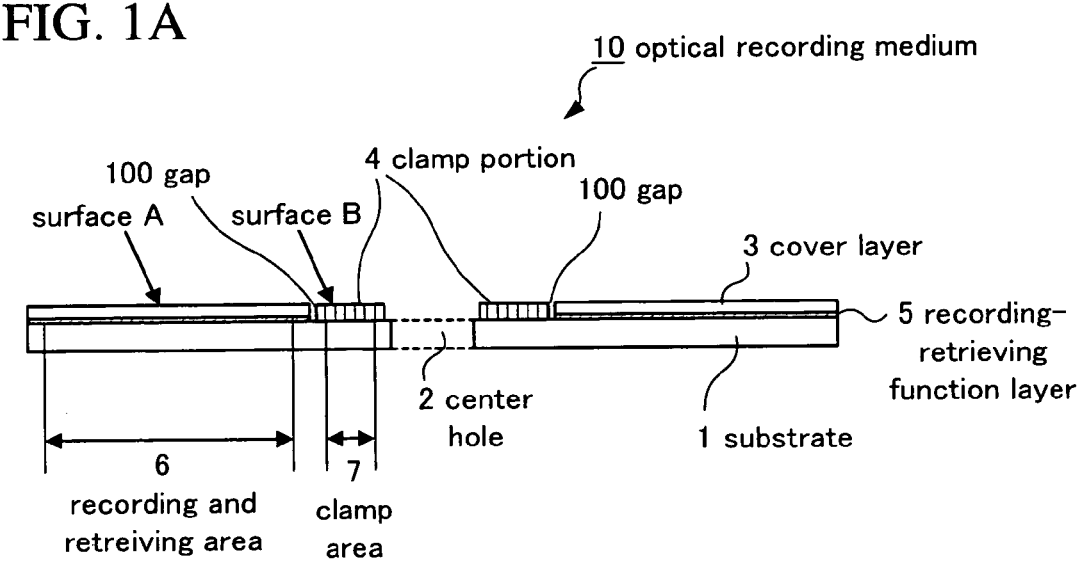
FIGS. 1A and 1B are views for explaining optical recording media to which an embodiment of the present invention is applied.
Figure 1B:
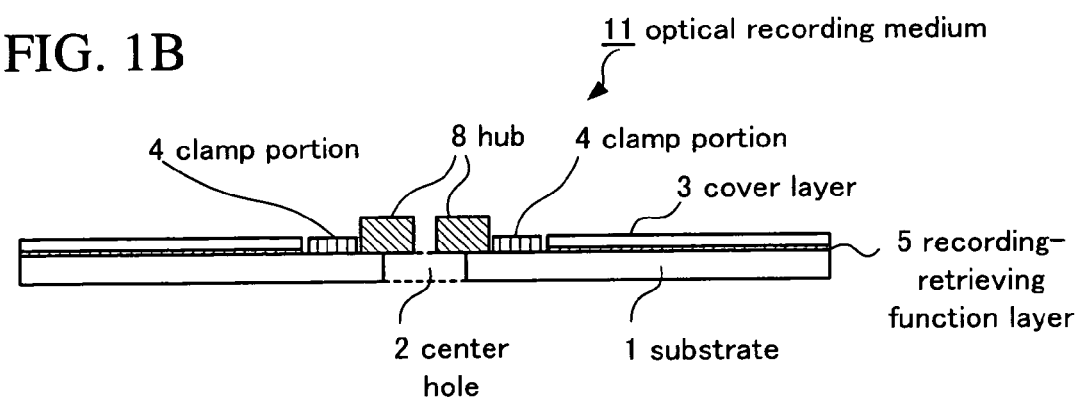

FIGS. 1A and 1B are views for explaining optical recording media to which the present embodiment is applied. FIG. 1A is a cross-sectional structure diagram of an optical recording medium 10, which is a first embodiment. FIG. 1B is a cross-sectional structure diagram of an optical recording medium 11, which is a second embodiment. The optical recording medium 10 shown in FIG. 1A has a substrate 1 in which a center hole 2 is opened at the center thereof, a recording-retrieving function layer 5 which is formed on the substrate 1 and in which the recording and/or retrieving of information signals is performed by means of irradiated light, a cover layer 3 formed on the recording-retrieving function layer 5, and a clamp portion 4 provided around the center hole 2 of the substrate 1. The clamp portion 4 is provided in a region where the cover layer 3 is not formed. A gap 100 is provided between the clamp portion 4 and the cover layer 3.

Figure 2:
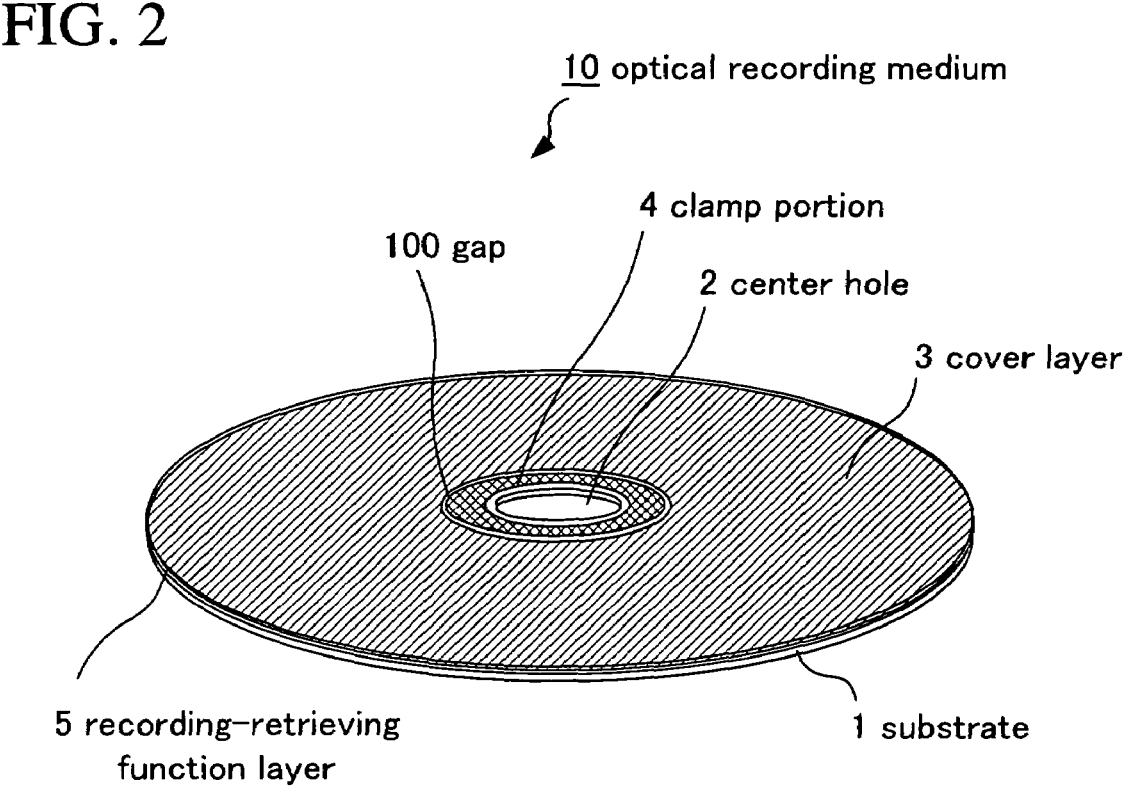
FIG. 2 is a perspective view of the optical recording medium shown in FIG. 1A.

FIG. 2 is a perspective view of the optical recording medium 10 shown in FIG. 1A. As shown in FIG. 2, in the optical recording medium 10 having a plane ring shape, the recording-retrieving function layer 5 and the cover layer 3, which have outer diameters approximately equal to that of the substrate 1 and inner diameters larger than the outer diameter of the center hole 2 (inner diameter of the substrate 1), are stacked on the substrate 1 in which the center hole 2 is opened at the center thereof. Here, the inner diameter of the recording-retrieving function layer 5 may be approximately equal to the outer diameter of the center hole 2. Incidentally, in order to protect the recording-retrieving function layer 5 by the cover layer 3, it is preferable making the outer diameter of the recording-retrieving function layer 5 to be smaller than the outer diameter of the substrate 1, and making the outer diameter of the cover layer 3 to be approximately equal to the outer diameter of the substrate 1. Moreover, it is preferable making the inner diameter of the cover layer 3 to be smaller than the inner diameter of the recording-retrieving function layer 5. As a result, the recording-retrieving function layer 5 is covered with the cover layer 3, then recording-retrieving function layer 5 can be protected effectively. Further, as a separate entity from the cover layer 3, the clamp portion 4, which has an inner diameter larger than the outer diameter of the center hole 2 (inner diameter of the substrate 1) and an outer diameter smaller than the inner diameters of the recording-retrieving function layer 5 and the cover layer 3, is provided around the center hole 2.

Here, the "separate entity" does not mean that the clamp portion 4 and the cover layer 3 are formed as a unit. The "separate entity" means that the respective formed bodies thereof are separately provided on the substrate 1 or the recording-retrieving function layer 5. Further, "approximately equal" or "approximately correspond" in the present embodiment means that an error of several % in comparison with complete equality (complete correspondence) is tolerable. Such an error is inherent in industrial production. It is noted that, though the gap 100 is provided between the clamp portion 4 and the cover layer 3 in the optical recording medium 10 shown in FIG. 1A, the clamp portion 4 may be provided being in contact with the cover layer 3 without providing of the gap 100. Further, though the inner diameter of the clamp portion 4 is made larger than the outer diameter of the center hole 2 (inner diameter of the substrate 1) in FIG. 1A, the inner diameter of the clamp portion 4 and the outer diameter of the center hole 2 (inner diameter of the substrate 1) may, of course, be approximately equal to each other.

A groove (not shown) shaped concavo-convex used for recording and retrieving of optical information is provided on the surface of the substrate 1 where the recording-retrieving function layer 5 is provided. The substrate, for example, is formed with optically transparent resin by injection-molding using a stamper.

Material for the substrate 1 is not particularly limited. For example, thermoplastic resins including polycarbonate resin, poly methacrylate resin, and polyolefin resin, and glass can be used. Among these, polycarbonate resin is most preferable because it is most widely used in CD-ROMs and the like and inexpensive. It is noted that, in the case where the optical recording medium 10 is used as a substrate incident-type optical recording medium in which light for recording or retrieving is made incident on the recording-retrieving function layer 5 from the substrate 1 side, it is desirable that the substrate 1 is transparent to light for recording or retrieving.

The thickness of the substrate 1 is generally 0.1 mm or more, preferably 0.3 mm or more, more preferably 0.5 mm or more; and 20 mm or less, preferably 15 mm or less, more preferably 3 mm or less. In general, the thickness of the substrate 1 is set to approximately 1.1 mm. The outer diameter of the substrate 1 is generally approximately 120 mm. The diameter of the center hole 2 provided at the center is generally approximately 15 mm.

The recording-retrieving function layer 5 is a layer configured to exert a function capable of recording and retrieving information signals or retrieving information signals, and may include a single layer or a plurality of layers. Layer configurations of the recording-retrieving function layer 5 can be selected according to a type of the recording medium, such as the optical recording medium 10 is a read-only medium (ROM medium), a write once medium in which recording is allowed only once (Write Once medium), or a rewritable medium in which recording and erasing can be repeatedly performed (Rewritable medium).

Moreover, in write once media and rewritable media, the layer configuration of the recording-retrieving function layer 5 generally differs between a substrate incident-type medium and a surface incident-type medium. In a read-only medium, the recording-retrieving function layer 5 generally includes a single layer containing metal such as Al, Ag, or Au. For example, the recording-retrieving function layer 5 is formed by depositing an Al, Ag, or Au reflecting layer on the substrate by sputtering.

In a write once medium of a surface incident-type, the recording-retrieving function layer 5 is generally formed by providing a reflecting layer containing metal, such as Al, Ag, or Au, and a recording layer containing organic dye material in this order on the substrate 1. On the other hand, in a write once medium of a substrate incident-type, the recording-retrieving function layer 5 is formed by providing the recording layer and the reflecting layer in this order on the substrate 1 (i.e., the layer configuration of the reflecting layer and the recording layer is opposite to that of the surface incident-type medium).

In such a write once medium, the reflecting layer is generally formed by sputtering. Further, the recording layer containing organic dye material is generally formed by spin coating.

In another specific example of a write once medium of a surface incident-type, the recording-retrieving function layer 5 is formed by providing a reflecting layer containing metal, such as Al, Ag, or Au, a dielectric layer, a recording layer, and a dielectric layer in this order on the substrate 1. Further, in another specific example of a write once medium of a substrate incident-type, the recording-retrieving function layer 5 is formed by providing a dielectric layer, a recording layer, a dielectric layer, and a reflecting layer in this order on the substrate 1. Moreover, in both types of write once media, dielectric layers and recording layers generally contain inorganic material. In such a write once medium, a reflecting layer, dielectric layers, and a recording layer are generally formed by sputtering.

In a rewritable medium of a surface incident-type, the recording-retrieving function layer 5 is generally formed by providing a reflecting layer containing metal, such as Al, Ag, or Au, a dielectric layer, a recording layer, and a dielectric layer in this order on the substrate 1. On the other hand, in a rewritable medium of a substrate incident-type, the recording-retrieving function layer 5 is generally formed by providing a dielectric layer, a recording layer, a dielectric layer, and the above-described reflecting layer in this order on the substrate 1. Further, in both types of rewritable media, dielectric layers and recording layers generally contain inorganic material. In such a rewritable medium, a reflecting layer, dielectric layers, and a recording layer are generally formed by sputtering.

Other specific examples of rewritable media include a magneto-optical recording medium (MO disk).

As described above, in the present embodiment, the optical recording medium 10 may be used as a substrate incident-type medium on which light for recording or retrieving is made incident from the substrate 1 side, or may be used as a surface incident-type medium on which light for recording or retrieving is made incident from the cover layer 3 side. In particular, a surface incident-type medium allows high-density recording, and exerts remarkable effects, such as high reliability of the recording and retrieving of information signals. Accordingly, in the present embodiment, the cover layer 3 is formed to allow light used for the recording and/or retrieving of information signals to pass therethrough, and it is preferable that the light is irradiated to the recording-retrieving function layer 5 after passing through the cover layer 3.

Incidentally, a recording and retrieving area 6 is set in the recording-retrieving function layer 5. The recording and retrieving area 6 is generally provided in a region having an inner diameter larger than that of the recording-retrieving function layer 5 and an outer diameter smaller than that of the recording-retrieving function layer 5.

Figure 3:
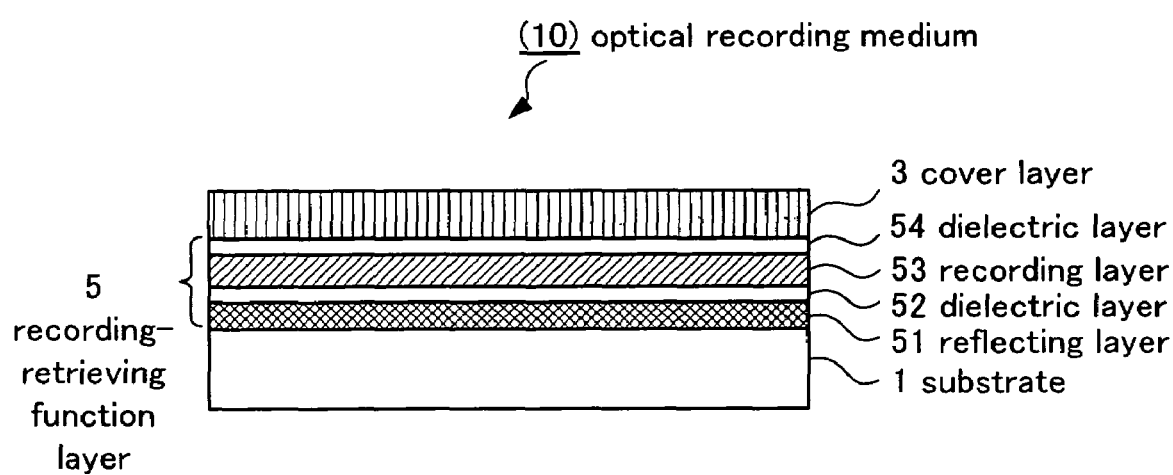
FIG. 3 is a diagram for explaining one example of a recording-retrieving function layer in a rewritable optical recording medium.

FIG. 3 is a diagram for explaining one example of the recording-retrieving function layer 5 in the optical recording medium 10 of a rewritable type. The recording-retrieving function layer 5 includes a reflecting layer 51 which is provided directly on the substrate 1 and which is formed of metal material, a recording layer 53 formed of phase change-type material, two dielectric layers 52 and 54 provided to hold the recording layer 53 therebetween from above and below.

Material used for the reflecting layer 51 is preferably a material having a large reflectivity. In particular, metal, such as Au, Ag, or Al, whose heat dissipating effect can be expected, is preferable. Further, in order to control the heat conductivity of the reflecting layer itself and improve the resistance to corrosion thereof, a small amount of metal, such as Ta, Ti, Cr, Mo, Mg, V, Nb, Zr, or Si, may be added thereto. The amount of the metal added thereto by a small amount is generally 0.01 atomic percent or more and 20 atomic percent or less. Among the above, aluminum alloys containing Ta and/or Ti at 15 atomic percent or less, particularly the alloys $Al_\alpha Ta_{1-\alpha}$ ($0 \leq \alpha \leq 0.15$), are excellent in resistance to corrosion, and particularly preferable materials for the reflecting layer in terms of the improvement of reliability of the optical recording medium. Moreover, Ag alloy containing any one of Mg, Ti, Au, Cu, Pd, Pt, Zn, Cr, Si, Ge, a rare-earth element at 0.01 atomic percent or more and 10 atomic percent or less in addition to Ag is preferable because of the high reflectivity, the high heat conductivity, and the excellent heat resistance thereof.

The thickness of the reflecting layer 51 is generally 40 nm or more, preferably 50 nm or more; and generally 300 nm or less, preferably 200 nm or less. If the thickness of the reflecting layer 51 is excessively large, the shape of a groove for tracking which is formed in the substrate 1 tends to change. Further, it takes a long time for deposition. Furthermore, material cost tends to increase. On the other hand, if the thickness of the reflecting layer 51 is excessively small, the reflecting layer 51 may not function as a reflecting layer because light transmission occurs. Moreover, an island structure which is formed in the early stage of deposition is prone to affect on part of the reflecting layer 51, and the reflectivity and the heat conductivity may be reduced.

Material used for the two dielectric layers 52 and 54 is used to prevent the evaporation and deformation of the recording layer 53 which occurs in case of phase change of the recording layer 53 and to control thermal diffusion at the same time. The material for the dielectric layers is determined in consideration of a refractive index, a heat conductivity, chemical stability, mechanical strength, adhesiveness, and the like. In general, highly transparency and high-melting point dielectric materials such an oxide, sulfide, nitride, or carbide of metal or semiconductor, or a fluoride of Ca, Mg, Li, or the like, can be used. Such an oxide, sulfide, nitride, carbide, or fluoride may not necessarily take a stoichiometric composition. Controlling the composition and using the above-described materials in a mixed state for the control of a refractive index and the like are also effective.

Specific examples of such dielectric materials include, for example, oxides of metals, such as Sc, Y, Ce, La, Ti, Zr, Hf, V, Nb, Ta, Zn, Al, Cr, In, Si, Ge, Sn, Sb, and Te; nitrides of metals, such as Ti, Zr, Hf, V, Nb, Ta, Cr, Mo, W, Zn, B, Al, Ga, In, Si, Ge, Sn, Sb, and Pb; carbides of metals, such as Ti, Zr, Hf, V, Nb, Ta, Cr, Mo, W, Zn, B, Al, Ga, In, and Si; and mixtures of the foregoing. Moreover, sulfides, selenides, and tellurides of metals, such as Zn, Y, Cd, Ga, In, Si, Ge, Sn, Pb, Sb, and Bi; fluorides of Mg, Ca, and the like; and mixtures of the foregoing also can be included therein.

Considering overwriting properties, a mixture of dielectric materials is preferable. For example, a mixture of chalcogenide, such as ZnS or rare-earth sulfide, and a heat resistant compound, such as oxide, nitride, carbide, or fluoride, can be cited. For example, a mixture containing ZnS as the main component and a heat resistant compound, and a mixture containing rare-earth sulfide, particularly $Y_2O_2S$, as the main component and a heat resistant compound, are preferable examples of the composition of a dielectric layer. More specifically, $ZnS\text{-}SiO_2$, SiN, $SiO_2$, $TiO_2$, CrN, $TaS_2$, $Y_2O_2S$, and the like can be cited. Among these materials, $ZnS\text{-}SiO_2$ is widely used, as the film forming rate is high, the film stress is small, the volume change due to a temperature change is small, and it has excellent weather resistance. The thickness of the dielectric layer 52 or 54 is generally 1 nm or more and 500 nm or less. By setting the thickness of the dielectric layer 52 or 54 to 1 nm or more, the effect of preventing the deformation of the substrate 1 and the recording layer 53 can be sufficiently ensured, and the dielectric layer 52 or 54 can sufficiently act as a dielectric layer. Further, by setting the thickness of the dielectric layer 52 or 54 to 500 nm or less, it is possible to prevent the occurrence of a crack which is considered to be caused by the internal stress of the dielectric layer 52 or 54 itself and by the significant difference in elastic properties between the dielectric layer 54 and the substrate 1.

As material used to form the recording layer 53, for example, compounds having the compositions GeSbTe, InSbTe, AgSbTe, AgInSbTe, and the like can be cited. Among these, a thin film having $\{(Sb_2Te_3)_{1-x}(GeTe)_x\}_{1-y}Sb_y$ ($0.2 \leq x \leq 0.9$, $0 \leq y \leq 0.1$) alloy or $(Sb_xTe_{1-x})_yM_{1-y}$ ($0.6 \leq x \leq 0.9$, $0.7 \leq y \leq 1$, M is at least one selected from Ge, Ag, In, Ga, Zn, Sn, Si, Cu, Au, Pd, Pt, Pb, Cr, Co, 0, S, Se, V, Nb, Ta) alloy as the main component, is stable in both crystal and amorphous states, and allows fast phase transition between both states. In addition, these materials have the advantage that segregation hardly occurs when overwrite is repeatedly performed, and are therefore most practical materials.

The film thickness of the recording layer 53 is generally 5 nm or more, preferably 10 nm or more. Within this range, sufficient optical contrast between the amorphous and crystal states can be obtained. Further, the film thickness of the recording layer 53 is generally 30 nm or less, preferably 20 nm or less. Within this range, it is possible to obtain an increase in optical contrast due to the fact that light having passed through the recording layer 53 is reflected by the reflecting layer, and fast recording can also be performed because heat capacity can be adjusted to an appropriate value. In particular, if the film thickness of the recording layer 53 is set to 10 nm or more and 20 nm or less, faster recording and higher optical contrast can be mutually compatible. Volume change associated with phase change is reduced by setting the thickness of the recording layer 53 within such a range, thus it is made possible to reduce the influence of volume change repeatedly caused by overwriting. The influence is exerted on the recording layer 53 itself and other layers being in contact with the top and bottom of the recording layer 53. Furthermore, the accumulation of irreversible microscopic deformation of the recording layer 53 is suppressed, noise is reduced, and overwriting durability is improved.

The reflecting layer 51, the recording layer 53, and the dielectric layers 52 and 54 are generally formed by sputtering or the like. It is desirable, in terms of the prevention of oxidation and contamination between each layer, to perform film deposition by using in-line equipment in which a target for the recording layer, a target for the dielectric layers, and, if necessary, a target for the reflecting layer, are installed in the vacuum chamber thereof. Further, it is also excellent in terms of productivity.

The cover layer 3 is provided being in contact with the recording-retrieving function layer 5, generally has an outer diameter approximately equal to that of the substrate 1 and an inner diameter equal to or smaller than that of the recording-retrieving function layer 5, and has a plane ring shape. It is noted that the cover layer may be provided in a region on the substrate 1 where the recording-retrieving function layer 5 is not provided. Preferably, the inner diameter of the cover layer 3 is smaller than the inner diameter of the recording-retrieving function layer 5. Moreover, preferably, the outer diameter of the cover layer 3 is larger than the outer diameter of the recording-retrieving function layer 5.

In the case where the optical recording medium 10 is a surface incident-type medium, the cover layer 3 is generally formed of a material which allows laser light used for recording and retrieving to pass therethrough. In this case, the transmittance of the cover layer 3 generally needs to be 80% or more, preferably 85% or more, more preferably 87% or more, at the wavelength of light used for recording and retrieving. Within such a range, loss due to the absorption of light used for recording and retrieving can be minimized. Meanwhile, it is most preferable that the transmittance becomes 100%, but the transmittance generally becomes 99% or less because of the performance of a material to be used.

On the other hand, in the case where the optical recording medium 10 is a substrate incident-type medium, laser light for recording and retrieving generally does not pass through the cover layer 3, and therefore the cover layer 3 does not need to be optically transparent.

The cover layer 3 is preferably formed of curable resin. Curable resins include, for example, thermosetting resin and photocurable resin. More preferably, the cover layer 3 is formed of photocurable resin.

Such a curable resin is sufficiently transparent to blue laser light having a wavelength near 405 nm which is used for the recording and retrieving of an optical disk, and therefore suitable for the cover layer 3 in the case where the optical recording medium 10 is a surface incident-type medium. Further, it is desirable that the curable resin has the property of protecting the recording-retrieving function layer 5 formed on the substrate 1 from water and dust. Furthermore, the use of the curable resin for the cover layer 3 makes optical properties of the cover layer 3 favorable. For example, focus servo properties become easy to obtain.

Incidentally, it is desirable that the curable resin has a low shrinkage factor in order to suppress the warpage of the medium after curing. If photocurable resin is used as the curable resin, the warpage of the medium after curing is effectively suppressed. As the photocurable resin, for example, radical polymerization-type acrylic ester resin or cationic polymerization-type epoxy resin is preferably used.

Specific examples of radical polymerization-type resin as photocurable resin include, for example, various kinds of acrylates, such as unsaturated polyester, urethane acrylate, epoxy acrylate, oligoester acrylate, and polyether acrylate. Further, general photopolymerizable monomer is acrylic ester. Aromatic carbonyl compound is mainly general as a photo-initiator. The amount of the photo-initiator added to the photocurable resin is preferably 0.1 wt % to 10 wt %. As an example of radical polymerization-type resin, trade name: DIABEAM (trademark), manufactured by Mitsubishi Rayon Co., Ltd and trade name: DIACURE CLEAR (trademark), manufactured by Dainippon Ink and Chemicals, Inc. can be cited.

Specific examples of cationic polymerization-type resin as photocurable resin include, for example, epoxy resin, vinyl ether resin, cyclic ether resin, and the like. In particular, epoxy resin is suitable. Epoxy resins include a bisphenol type, a novolac type, an alicyclic type, an aliphatic type, and the like. In particular, the alicyclic type is preferable. In this case, as the photo-initiator, aromatic diazonium salt, aromatic sulfonium salt, a metallocene compound, and the like can be cited. In particular, aromatic sulfonium salt is preferable. The amount of the photo-initiator added to the photocurable resin is preferably 0.1 to 10 wt %. As an example of cationic polymerization-type resin, trade name: STRUCTBOND (trademark), manufactured by Mitsui Chemicals, Inc can be cited.

The film thickness of the cover layer 3 is generally 10 μm or more, preferably 30 μm or more, more preferably 50 μm or more, even more preferably 70 μm or more, most preferably 90 μm or more. If the film thickness is set within such a range, the influence of dust and a scratch on the surface of the cover layer 3 can be reduced, and a thickness sufficient for protecting the recording-retrieving function layer 5 from water and the like of the outside air can be ensured. On the other hand, the film thickness of the cover layer 3 is generally 300 μm or less, preferably 200 µm or less, more preferably 150 µm or less, even more preferably 130 µm or less, most preferably 110 µm or less. If the film thickness is set within this range, a uniform film thickness can be easily obtained by a general coating method used in spin coating and the like. The cover layer 3 is preferably formed in a range covering the recording-retrieving function layer 5 to have a uniform film thickness.

Incidentally, in the case where the optical recording medium 10 is a surface incident-type medium, the film thickness of the cover layer 3 has an important influence on the performance of an objective lens used for recording and retrieving. The objective lens is designed in consideration of the thickness of the cover layer 3. Accordingly, the thickness of the cover layer 3 needs to be precisely set to a thickness defined by a design value of the objective lens, in accordance with the optical refractive index of the cover layer 3. In terms of reducing the spherical aberration of the objective lens to obtain favorable focused light, the film thickness of the cover layer 3 is generally within the range of an average film thickness ±5%, preferably within the range of the average film thickness ±3%. For example, suppose that an objective lens designed on the following assumption is used as a recording and retrieving system: blue laser light having a wavelength of 405 nm is used, the numerical aperture (NA) of the lens is 0.85, and the refractive index n of the cover layer 3 is 1.5. In order to make wave aberration negligible, the film thickness of the cover layer 3 generally needs to be controlled within the range of an average film thickness ±5%, preferably within the range of the average film thickness ±4%, more preferably within the range of the average film thickness ±3%.

Moreover, in the case where the film thickness of the cover layer 3 periodically fluctuates, the period of fluctuation of the film-thickness is preferably 5 mm or more within the fluctuation range of the above-described average film thickness. The period of fluctuation of the film thickness is more preferably 5 mm or more in both radial and circumferential directions of the optical recording medium 10.

On the other hand, in the case where the optical recording medium 10 is a substrate incident-type medium, the cover layer 3 is generally used in order to prevent the recording-retrieving function layer 5 and air from coming into direct contact with each other and to prevent a scratch due to the contact between the recording-retrieving function layer 5 and a dust. The film thickness of the cover layer 3 in this case is generally set to 1 µm to several hundred µm. Further, in the case where the optical recording medium 10 is a substrate incident-type medium, for example, a high-hardness dielectric protective layer can be provided on the cover layer 3. Moreover, a resin layer can also be provided on this dielectric protective layer.

From the viewpoint of ensuring uniformity against optical noise, the cover layer 3 is preferably formed by spin-coating a precursor of photocurable resin, which cures by the irradiation of ultraviolet rays, and by curing the precursor. Here, the precursor of the ultraviolet-curing resin for performing spin coating preferably has a high viscosity of approximately 1000 to 5000 mPa·s.

Figure 4:
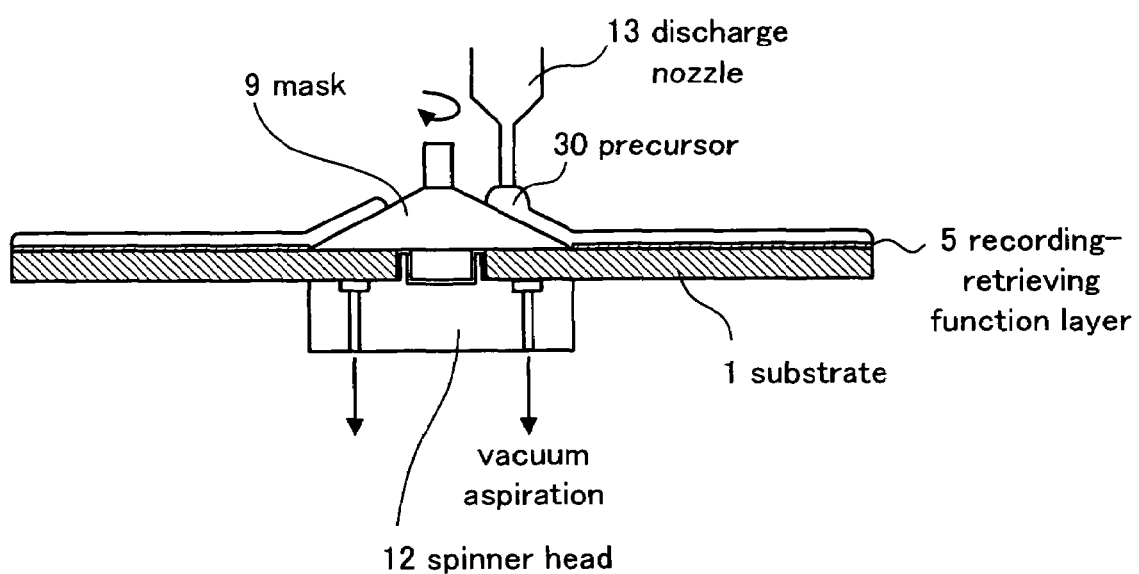
FIG. 4 is a view for explaining a method of forming a cover layer by spin coating.

FIG. 4 is a view for explaining a method of forming the cover layer 3 by spin coating. FIG. 4 shows the substrate 1 which has a plane ring shape and on which the recording-retrieving function layer 5 is provided, a spinner head 12 to which the substrate 1 is attached by vacuum aspiration, a circular mask 9 which has the shape of an umbrella and which is inserted in the center hole of the substrate 1, and a discharge nozzle 13 for discharging coating liquid of the precursor 30 of the photocurable resin. The mask 9 is placed at the center of the substrate 1. Next, the liquid precursor 30 of the photocurable resin is dropped from the discharge nozzle 13 onto the mask 9. After that, the spinner head 12 is rotated at high speed, whereby a uniform coating film of the precursor 30 of the photocurable resin is formed on the substrate 1 to cover the recording-retrieving function layer 5. Then, after the mask 9 has been removed, ultraviolet rays are irradiated to this uniform coating film, and thereby the precursor of the photocurable resin is cured to form the cover layer 3. Here, in the case where the diameter of the substrate 1 is, for example, 120 mm, the cover layer 3 needs to be formed to have a uniform thickness in a region having a diameter of 40 mm or more, in order to cover the recording-retrieving function layer 5. Accordingly, the diameter of the mask 9 for applying the precursor 30 of the photocurable resin is generally set to 35 mm to 38 mm.

Incidentally, as shown in the aforementioned FIG. 1A, the clamp portion 4 is provided in a clamp area 7. The clamp area 7 is a region on the substrate 1 where the cover layer 3 is not formed, a ring-shaped region between the outer circumference of the center hole 2 of the substrate 1 and the inner circumference of the recording and retrieving area 6, and a region where the optical recording medium 10 and a clamp mechanism of a read and write device (drive) come into contact with each other when the optical recording medium 10 is fixed in an external mechanism (hereinafter referred to as rotation mechanism). The clamp portion 4 sets a clamp reference plane in the clamp area 7. That is, the clamp portion 4 is provided being in contact with the substrate 1 or the recording-retrieving function layer 5, and has a plane ring shape having an outer diameter equal to or smaller than the inner diameter of the cover layer 3 and an inner diameter equal to or larger than that of the substrate 1. For example, in the case where the diameter of the substrate 1 is 120 mm, the size of the clamp portion 4 is selected within the range in which the inner diameter of the clamp portion 4 is 22 to 24 mm and in which the outer diameter thereof is 32 to 34 mm. Moreover, in order to reduce the axial runout of the optical recording medium 10 during rotation when the optical recording medium 10 is rotated while being held and fixed in a read and write divice, the distribution of the film thickness of the clamp portion 4 is generally controlled within the range of an average film thickness ±20%, preferably within the range of the average film thickness ±10%. Specifically, the distribution of the film thickness is generally set within the range of the average film thickness ±0.1 mm, preferably within the range of the average film thickness ±0.05 mm. Within this range, the rotation of the optical recording medium 10 can be favorably driven. It is noted that the distribution of the film thickness of the clamp portion 4 is measured by use of, for example, a contact-type step gauge.

Moreover, it is desirable to reduce scratches on the surface of the clamp portion 4 which occur when the optical recording medium 10 is fixed in a rotation mechanism. Accordingly, the pencil hardness of the surface of the clamp portion 4 is preferably 2H or more. Further, the friction coefficient of the clamp portion 4 is preferably 0.3 or less.

Materials which satisfy such properties required for the clamp portion 4 include, for example, thermoplastic resin. The clamp portion 4 generally has a sheet layer made of an appropriate material and an adhesive layer for adhering the sheet layer to the surface of the substrate 1 and the like. The sheet layer is used for determining the clamp reference plane, and therefore preferably has a uniform film thickness. Further, the sheet layer is a portion which comes into contact with the rotation mechanism in order to hold and fix the optical recording medium 10, and is therefore preferably made of a material having friction force sufficient for being surely fixed to the rotation mechanism. Moreover, a material which suffers less wear and deformation due to attachment and detachment to/from the rotation mechanism, is preferable. If wear and deformation occur in the clamp portion 4, the contact state with the rotation mechanism becomes worse, and this causes axial runout.

As material for the sheet layer of the clamp portion 4, for example, synthetic resins (thermoplastic resins), such as polycarbonate, polyethylene terephthalate (PET), polyimide, vinyl chloride resin, and cyclic polyolefin; metals, such as stainless steel and aluminum, can be cited. Specific commercial products include the trade name of PURE-ACE (trademark) manufactured by Teijin Limited, as polycarbonate; the trade name of ELMECH (trademark) manufactured by Kaneka Corporation, as polyarylate; the trade name of ZEONOR (trademark) manufactured by ZEON Corporation, as cycloolefin polymer; and the like.

In particular, by use of polycarbonate and PET, sheets which have uniform thickness and excellent durability are supplied. In addition, polycarbonate and PET are inexpensive, and therefore they are suitable. The friction coefficient of such a sheet layer made of aforementioned materials may be increased by roughening the surface thereof. The film thickness of the sheet layer can be appropriately set in consideration of the film thickness of the adhesive layer, which is described later, and the film thickness of the cover layer 3.

As material for the adhesive layer, for example, adhesives such as silicon, acrylic, synthetic rubber, and vinyl acetate can be cited. The thickness of the adhesive layer is generally 0.1 µm or more, preferably 1 µm or more. Within such a range, sufficient adhesive force can be obtained. On the other hand, the thickness of the adhesive layer is generally 20 µm or less, preferably 10 µm or less. Such a range is suitable for forming the adhesive layer having a uniform thickness. Thus, the clamp portion 4 including the sheet layer and the adhesive layer is generally formed by adhering a sheet member, which is stamped into the shape of a ring in accordance with the clamp area 7, to the surface of the substrate 1 or the like. The sheet layer provided being in contact with the adhesive layer sets the clamp reference plane. In the case where the diameter of the substrate 1 is, for example, 120 mm, a member having the shape of a ring, a diameter (e.g., 22 mm or more) larger than that of the center hole 2 (e.g., 15 mm), and a diameter (e.g., 34 to 36 mm or less) which covers the clamp area 7 and which is equal to or smaller than that of the region where the cover layer 3 is formed, can be used as the clamp portion.

Methods of forming the clamp portion 4 include a method in which the clamp portion 4 is printed into the shape of a ring on the substrate 1 or the recording-retrieving function layer 5 by printing. The method of printing the clamp portion 4 by printing is suitable for mass production because the clamp portion 4 having an appropriate film thickness can be easily formed in only a necessary portion on the substrate 1 or on the recording-retrieving function layer 5. Printing materials used to form the clamp portion 4 include a polyurethane solvent-drying type and an acrylic ultraviolet-curing type. Further, for a printing method, using heretofore known screen printing is suitable for forming a thick film.

In the optical recording medium 10 to which the present embodiment is applied, the clamp portion 4 and the cover layer 3 are provided as separate entities (the clamp portion 4 is formed in a region where the cover layer 3 is not formed) respectively. Accordingly, a step may occur between the clamp portion 4 and the cover layer 3. In this case, the step height between the surface of the clamp portion 4 and that of the cover layer 3 is generally set within the range of ±0.05 mm, preferably within the range of ±30 µm, more preferably within the range of ±10 µm. In general, the film thickness of the recording-retrieving function layer 5 is negligibly small compared to the film thicknesses of the clamp portion 4 and the cover layer 3. Accordingly, if the film thickness of the clamp portion 4 and that of the cover layer 3 are adjusted so as to be approximately equal to each other, the top surface of the cover layer 3 (e.g., surface A in FIG. 1A) and the top surface of the clamp portion 4 (e.g., surface B in FIG. 1A) can be favorably aligned.

The surface of the clamp portion 4 becomes a reference plane used when a read and write device (drive) holds the disk. The position of an objective lens for recording and retrieving the disk is set based on the reference plane. In this case, if there are variations in the difference in height between the surface of the cover layer 3 and the top surface of the clamp portion 4, the objective lens comes into contact with the surface of the cover layer 3, or is so far removed from a focusing zone. Accordingly, the difference in height between both surfaces needs to be within a certain range. Of course, the heights of the two can also be set so that there is a certain step height between them. Furthermore, variations in the heights of both surfaces can be further reduced by equalizing the heights of them.

Next, a second embodiment of an optical recording medium to which the present embodiment is applied will be described.

FIG. 1B is a view for explaining the second embodiment of the optical recording medium to which the present embodiment is applied. The optical recording medium 11 shown in FIG. 1B is provided with a ring-shaped hub 8 in such a manner that the center of the hub 8 is approximately aligned to the center of the center hole 2 opened at the center of the substrate 1. Other components of the optical recording medium 11 are the same as those of the optical recording medium 10 shown in FIG. 1A, and therefore will not be further described. The hub 8 is generally used for precisely aligning the center of an optical recording medium when the substrate 1 is holded in a rotating device. For example, as a system like MO disk, such as a system in which a disk is frequently attached and detached is used, or a reliable system in which decentering due to chucking shift is reduced is used, it is preferable to use the hub 8.

As material used for forming the hub 8, for example, magnetic metal, and a mixture of magnetic metal and thermoplastic resin, such as polycarbonate and polyacetal, can be cited. For the size of the hub 8, in accordance with specifications, for example, the outer diameter is 25 mm and the thickness is 2.2 mm in the case of a 5.25" MO disk, and the outer diameter is 15 mm and the thickness is 1.2 mm in the case of a 3.5" MO disk. In the case where material for the hub 8 is magnetic metal, methods of forming the hub 8 include a method in which integral molding is performed by a diaphragm process after the magnetic metal has been stamped. Further, in the case where material for the hub 8 is a mixture of magnetic metal and thermoplastic resin, methods of forming the hub 8 include a method in which the mixture of the magnetic metal and the thermoplastic resin is insert-molded. Moreover, the hub 8 is adhered to the periphery of the center hole 2 by use of ultraviolet-curing adhesive, ultrasonic welding, or the like.

Next, the function of the optical recording medium 10 to which the present embodiment is applied will be described.

As shown in FIG. 2, the optical recording medium 10 generally has a plane ring shape (a plane ring shape means, for example, a member such as a CD or a DVD, a discoid shape in which a hollow portion having a predetermined length from the center of the circle is formed).

Moreover, in the case where the optical recording medium 10 is a surface incident-type medium, laser light is made incident from the cover layer 3 side provided opposite to the substrate 1 side of the optical recording medium 10. That is, in the optical recording medium 10, recording or retrieving of information signals is performed by use of laser light which has passed through the cover layer 3 to be irradiated to the recording layer 53 formed in the recording-retrieving function layer 5.

On the other hand, in the case where the optical recording medium 10 is a substrate incident-type medium, laser light is made incident from the substrate 1 side of the optical recording medium 10. That is, in the optical recording medium 10, recording or retrieving of information signals is performed by use of laser light which has passed through the substrate 1 to be irradiated to the recording layer 53 formed in the recording-retrieving function layer 5.

Next, a method of manufacturing the optical recording medium 10 will be described.

First, the center hole 2 is opened by, for example, injection-molding in which a stamper is used, and the substrate 1 provided with a groove shaped concavo-convex for use in recording and retrieving of optical information is formed.

Then, in the step of forming the recording-retrieving function layer, layers such as the reflecting layer 51 and the recording layer 53 are formed by sputtering and/or spin coating depending on material to be used. Each layer is generally provided on the substrate 1 within a range whose inner diameter is approximately equal to or larger than the outer diameter of the center hole 2 and whose outer diameter is approximately equal to the outer diameter of the substrate 1. Further, the order of stacking the layers including the reflecting layer 51 and the recording layer 53 is determined in accordance with the type and recording mode of the optical recording medium 10.

Subsequently, in the step of forming the cover layer, a precursor 30 of photocurable resin is spin-coated on the recording-retrieving function layer 5 to cover the recording-retrieving function layer 5 and then cured by light, and thus the cover layer 3 having a predetermined thickness is formed.

Furthermore, in the step of forming the clamp portion, the clamp portion 4 is formed on the substrate 1 or the recording-retrieving function layer 5 within a range whose inner diameter is equal to or larger than the outer diameter of the center hole 2 and whose outer diameter is equal to or smaller than the inner diameter of the cover layer 3.

In the optical recording medium 10 to which the present embodiment is applied, the cover layer 3 and the clamp portion 4 for holding and fixing the optical recording medium 10 in a read and write device (drive) are provided as separate entities. Accordingly, the clamp portion 4 can be provided with emphasis placed on the sufficient improvement of flatness (mechanical flatness) of the surface thereof. If the optical recording medium 10 is held and fixed in the read and write device (drive) by chucking the clamp portion 4 having such improved mechanical flatness, the axial runout of the optical recording medium 10 during the rotation can be suppressed to a lower level. It is noted that, when the rotation of the optical recording medium 10 having a plane ring shape is driven, the axial runout for one cycle of the disk which is measured on the recording-retrieving function layer 5 is generally made to be 100 μm or less, preferably 50 μm or less. If axial runout is within this range, the axial runout is within the control range of focus servo, and a focus position can be made to track the displacement of the disk with high precision.

On the other hand, the cover layer 3, which is a separate entity from the clamp portion 4, can be provided in the optical recording medium 10 with emphasis placed on the uniformity of the film thickness of the cover layer 3 (i.e., uniformity against optical noise), so as to reduce optical noise (e.g., residual servo noise and the like) when recording or retrieving information is performed.

The optical recording medium 10 to which the present embodiment is applied makes it possible to perform stable recording and retrieving by forming the clamp portion 4 to be flat and reducing axial runout. Furthermore, the durability of the clamp portion 4 can be improved, and a high-performance and highly durable optical recording medium can be obtained.

EXAMPLES

Hereinafter, the present embodiment will be described in more detail based on examples. It is noted that the present embodiment is not limited to the examples.

Example 1

The optical recording medium 10 in which a clamp portion as separate entity from a cover layer was provided as shown in FIG. 1A was prepared in accordance with the following procedure.

Step of Forming Substrate

A polycarbonate substrate 1 which had a diameter of 120 mm and a thickness of 1.1 mm and in which a groove for tracking was previously formed at a track pitch of 0.32 μm, was prepared. It is noted that the groove width was approximately 50% of the track pitch, and that the groove depth was 20 to 30 nm.

Step of Forming Recording-Retrieving Function Layer

Next, a reflecting layer, a dielectric layer 1, a recording layer, and a dielectric layer 2, which are described below, were stacked in this order on the substrate 1 by sputtering to form a recording-retrieving function layer 5, and thus a rewritable optical recording medium was formed.

Reflecting layer: having a thickness of 100 nm, formed by use of Ag alloy.

Dielectric layer 1: transparent, having a thickness of 15 nm, formed by use of $ZnS/SiO_2$ (=80/20 (mol %)).

Recording layer: having a thickness of 14 nm, formed by use of InGeSbTe (In (2 to 8 at %), Ge (1 to 5 at %), Sb (65 to 80 at %) and Te (18 to 25 at %)).

Dielectric layer 2: transparent, having a thickness of 120 nm, formed by use of $ZnS-SiO_2$ (=80/20 (mol %))

Step of Forming Cover Layer

Next, a conical stainless mask having a diameter of 35 mm and a slope of 10 degrees was placed at the center of the substrate 1 on which the recording-retrieving function layer 5 was formed. Then, after a precursor of photocurable resin was dropped on the mask, the substrate 1 was rotated at 1500 rpm, whereby a uniform layer which was made of the precursor of the photocurable resin and which had a thickness of 100 μm was formed on the substrate 1. Subsequently, after the mask was removed, the layer made of the precursor of the photocurable resin was irradiated with a high pressure mercury lamp having a wavelength of 365 nm and an intensity of 200 $mw/cm^2$ for 5 seconds to be cured, and thus a cover layer 3 was formed. The curing reaction was caused in a nitrogen gas atmosphere, and thus the curing inhibition of oxygen was prevented. As the photocurable resin, radical polymerization-type acrylate resins (trade name: DIABEAM (trademark), manufactured by Mitsubishi Rayon Co., Ltd.; trade name:

DAICURE CLEAR (trademark), manufactured by Dainippon Ink and Chemicals, Inc.), cationic polymerization type resin (trade name: STRUCTBOND (trademark), manufactured by Mitsui Chemicals, Inc.) were used. The viscosity of the precursor of the photocurable resin was approximately 3,000 mPa·s.

Step of Forming Clamp Portion

Next, pressure sensitive adhesive (adhesive layer) having a thickness of 20 µm was formed on a high-density PET sheet (sheet layer) having a thickness of 80 µm, and thus a sheet having a total thickness of 100 µm was obtained. Then, this sheet was stamped into the shape of a ring having an inner diameter of 23.8 mm and an outer diameter of 34 mm, and thus a ring-shaped sheet was obtained. Subsequently, this ring-shaped sheet obtained by stamping was adhered to the surface of the disk with reference to the center hole of the substrate, and thus a clamp portion 4 was formed.

Film Thickness Measurement of Optical Recording Medium

The film thicknesses of the cover layer 3 and the clamp portion 4 formed on the disk of the optical recording medium 10 thus manufactured were measured. It is noted that an optical film thickness monitor (type name: DC-1010C, manufactured by cores Co., Ltd.) was used for the measurement of the film thickness of the cover layer 3. On the other hand, a contact-type surface step gauge (SURFCOM, manufactured by Tokyo Seimitsu Co., Ltd.) was used for the measurement of the film thickness of the clamp portion 4. The results are shown in Table 1.

TABLE 1

| Film Thickness Measurement Position | Diameter (mm) | Film Thickness (µm) |
|---|---|---|
| Cover Layer | 120-36 | 98 ± 3 |
| Cover Layer | 36-35 | 98 ± 10 |
| Substrate Surface | 35-34 | — |
| Clamp Portion | 34-23.8 | 100 ± 2 |
| Substrate Surface | 23.8-15 | — |

As shown in Table 1, the following can be seen: the step height between the cover layer 3 and the clamp portion 4 is approximately 2 µm between the portion in which the diameter is 120 to 36 mm and the clamp portion 4, and approximately 2 µm between the portion in which the diameter is 36 to 35 mm and the clamp portion 4; and the step height between the cover layer 3 and the clamp portion 4 is very small in all film thickness measurement positions.

Figure 7:
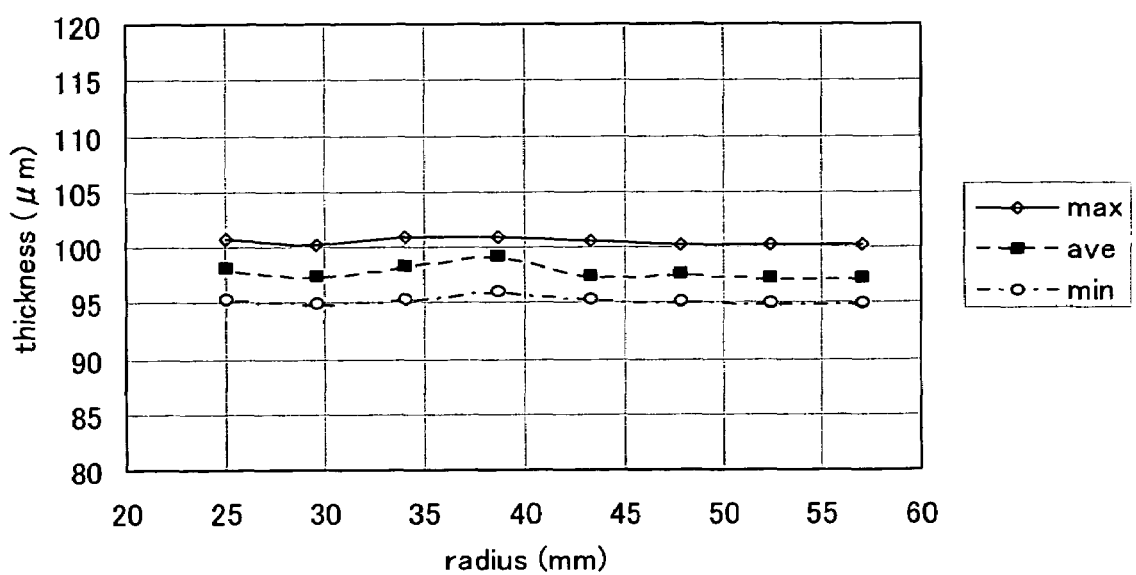
FIG. 7 is a graph showing the results of measuring the thickness of a cover layer of an optical recording medium in Example 1 at predetermined radial positions of a disk.

FIG. 7 is a graph showing the results of measuring the film thickness of the cover layer 3 of the optical recording medium 10 thus manufactured at predetermined radial positions of the disk. In FIG. 7, the horizontal axis represents the radius (radius: mm) from the center of the disk, and the vertical axis represents the film thickness (thickness: µm) of the cover layer. In FIG. 7, maximum (max), average (ave), and minimum (min) values of the film thickness of the cover layer 3 in the range in which the radius of the disk is approximately 25 mm to 57 mm are plotted.

A method of finding maximum (max), average (ave), and minimum (min) values of the film thickness of the cover layer 3 at the predetermined radial positions of the disk is as follows. That is, the film thickness of the cover layer 3 at the position at which the radius of the disk was 25 mm was measured for one cycle of the disk, then the maximum, minimum, and average values of film thickness data obtained in the measurement were found. Similar measurements were performed at the positions at which the radius of the disk was 29.6 mm, 34.1 mm, 38.7 mm, 43.3 mm, 47.4 mm, 52.4 mm, and 57 mm, and the maximum film thickness, the minimum film thickness, and the average value of the cover layer 3 at each radial position were found.

Referring to the results shown in FIG. 7, the film thickness of the cover layer 3 when the optical recording medium 10 manufactured by the aforementioned method is rotated by one full turn is 100 µm to 101 µm at the maximum, 97 µm to 99 µm on an average, and 93 µm to 96 µm at the minimum. From the result, it can be seen that the film thickness of the cover layer 3 is controlled within the range of approximately 98±3 µm and that the distribution of the film thickness is controlled within the range of the average value approximately ±3%.

Measurement of Transmittance of Cover layer

A cover layer 3 having a thickness of 100 µm was formed on a polycarbonate substrate 1 having a thickness of 1.1 mm by a method similar to that of the aforementioned step of forming a cover layer. Next, after the transmittance T1 of a polycarbonate substrate which had a thickness of 1.1 mm and on which no cover layer 3 was formed thereon was measured, the transmittance T2 of the above-described polycarbonate substrate on which the cover layer having a thickness of 100 µm is formed was measured, and T2/T1 was regarded as the transmittance of the cover layer. As the result of measuring T1 and T2 by use of a spectrophotometer (type name: UV-3100S, manufactured by Shimazu Corporation), the transmittance of the cover layer when laser light having a wavelength of 405 nm was irradiated thereto was 89%.

Axial Runout Measurement of Optical Recording Medium

Next, the axial runout measurement of an optical recording medium will be described.

Figure 5:
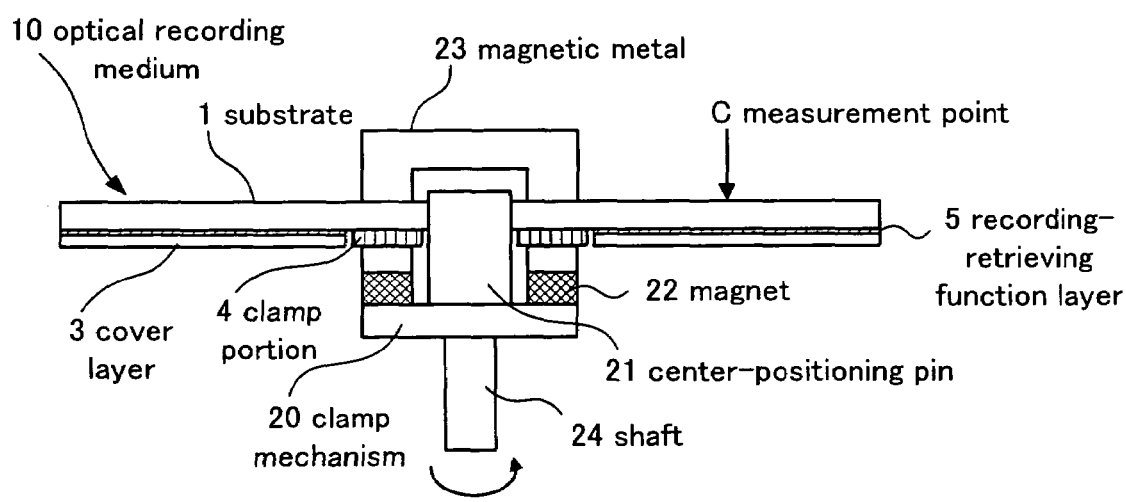
FIG. 5 is a view for explaining a method of measuring the axial runout of an optical recording medium.

FIG. 5 is a view for explaining a method of measuring the axial runout of an optical recording medium. The axial runout measurement apparatus shown in FIG. 5 includes an optical recording medium 10 on which axial runout measurement is performed, and a clamp mechanism 20 for holding the optical recording medium. The clamp mechanism 20 includes a center-positioning pin 21, a magnet 22, magnetic metal 23, and a rotating shaft 24. As shown in FIG. 5, the center-positioning pin 21 is inserted into the center hole 2 of the optical recording medium 10, the magnet 22 is pressed against the clamp portion 4 of the optical recording medium 10, and furthermore, the magnetic metal 23 is pressed against the substrate 1 side on the back of the optical recording medium 10 to hold and fix the optical recording medium 10. Then, the optical recording medium 10 is rotated by driving the rotation of the rotating shaft 24, and axial runout during rotation at, for example, measurement point C on the substrate 1 is measured by use of an optical displacement tester (type name: DC-1010, manufactured by cores Co., Ltd.). Specifically, laser light is made incident onto the disk at a predetermined incident angle in a state where the disk is being rotated, the laser light is reflected by the recording-retrieving function layer 5, and the reflected light is measured, whereby the axial runout of the disk is measured.

By using the axial runout measurement apparatus shown in FIG. 5, the axial runout of the optical recording medium 10 manufactured by the aforementioned method was measured. As a result, for the axial runout at the portion in which the circumferential radius was 58 mm when the optical recording medium 10 was rotated, the displacement for one cycle was 50 µm.

Focus Servo Properties of Optical Recording Medium

In order to evaluate focus servo noise due to variations in the film thickness of the cover layer 3 of the optical recording medium 10, the disk was rotated at a linear velocity of 5.28 m/s by use of a media tester (type name: DDU-1000, 405 nm, lens NA: 0.85, manufactured by Pulstec Industrial Co., Ltd.), and residual focus servo noise in a state where focus and track servo are working on the disk, was measured.

In a mode in which a specific track is always reproduced (still mode), a spiral groove formed in the disk is crossed once for one cycle of the disk. At this time, a focus error signal corresponding to the depth of the groove in the substrate is generated. Accordingly, by using the amplitude of this signal as a reference, the maximum value of focus noise to be occurred in a position other than the position where the groove is crossed, was normalized. The smaller this value is, the smaller the disturbance which affects focus servo is. Accordingly, high-precision focus tracking can be performed, and therefore stable recording and retrieving can be realized.

In the optical recording medium 10 prepared by the aforementioned method, the maximum value of normalized focus noise in a specific track at a radius of 55 mm was a sufficiently low value, which was 38%. Incidentally, in the case where the groove depth is 30 nm, normalized focus servo residual noise needs to be smaller than 100%, preferably 50% or less.

Comparative Example 1

As Comparative Example 1, an optical recording medium 61 was manufactured in which a cover layer and a clamp portion were formed of the same sheet to be one body and in which a reference plane in a clamp area is provided on the unitary sheet, and various properties of the optical recording medium 61 were evaluated.

Figure 6A:
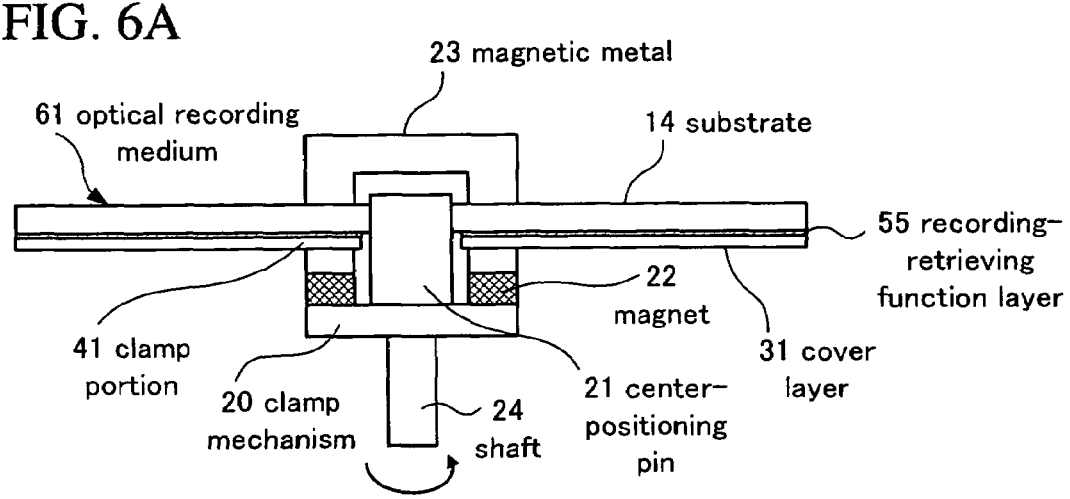
FIG. 6A is a view showing an optical recording medium in Comparative Example 1 attached to a clamp device.

FIG. 6A is a view showing the optical recording medium 61 manufactured in Comparative Example 1 and attached to a clamp mechanism.

The optical recording medium 61 comprises a polycarbonate substrate 14, a recording-retrieving function layer 55, and a cover layer 31 including a clamp portion 41, and is held in the clamp mechanism 20. The recording-retrieving function layer 55 was formed by performing an operation similar to that of Example 1.

The cover layer 31 including the clamp portion 41 was manufactured by the following method. First, transparent pressure-sensitive adhesive (transparent adhesive) having a thickness of 20 μm was stacked on a low-birefringent polycarbonate sheet (optically transparent sheet) having a thickness of 80 μm, and thus a sheet having a total thickness of 100 μm was manufactured. Next, this sheet was stamped into the shape of a ring having an inner diameter of 23.8 mm and an outer diameter of 120 mm. Then, the sheet stamped into the shape of a ring was adhered to the surface of the disk with reference to a center hole 2 of the substrate 14 to be formed into the cover layer 31 including the clamp portion 41.

Film Thickness Measurement of Optical Recording Medium 61

The result of measuring, by a method similar to that of Example 1, the film thickness of the cover layer 31 which includes the clamp portion 41 and which have been formed in the optical recording medium 61 is shown in Table 2.

TABLE 2

| Film Thickness Measurement Position | Diameter (mm) | Film Thickness (μm) |
|---|---|---|
| Cover Layer + Clamp Portion | 120-23.8 | 100 ± 2 |
| Substrate Surface | 23.8-15 | — |

Axial Runout Properties of Optical Recording Medium

As the result of measuring the axial runout of the optical recording medium 61 thus formed at the portion in which the circumferential radius was 58 mm by an operation similar to that of Example 1, the displacement for one cycle was 48 μm.

Focus Serve Properties of Optical Recording Medium

Focus servo noise due to variations in the film thickness of the cover layer 31 of the optical recording medium 61 was evaluated by an operation similar to that of Example 1. As a result, the maximum value of normalized focus noise in a specific track at a radius of 55 mm was 108%, and this was a very large value compared to that in the case of Example 1. The cause of the focus servo noise being large as described above is considered to be the fact that, though the amplitude of variations in the film thicknesses of the optically transparent sheet and the transparent adhesive in the circumferential direction are suppressed, the period of the amplitude is short. The above-described shortness of the period of the amplitude causes an impediment in terms of obtaining high-precision focus servo. In particular, since focus noise increases in proportion to the rotational frequency of the disk, the shortness of the period of the amplitude certainly causes a problem in high-speed recording and retrieving during high-speed rotation in the future. Further, the period of the amplitude when the focus servo noise of the optical recording medium 61 is evaluated, is estimated to be within the range of 0.1 mm to 5 mm at a linear velocity of 5 m/s.

Comparative Example 2

As Comparative Example 2, an optical recording medium 62 in which a cover layer and a clamp portion are formed as one body, was prepared by a method in which a precursor of photocurable resin is spin-coated. Various properties of the optical recording medium 62 were evaluated.

Figure 6B:
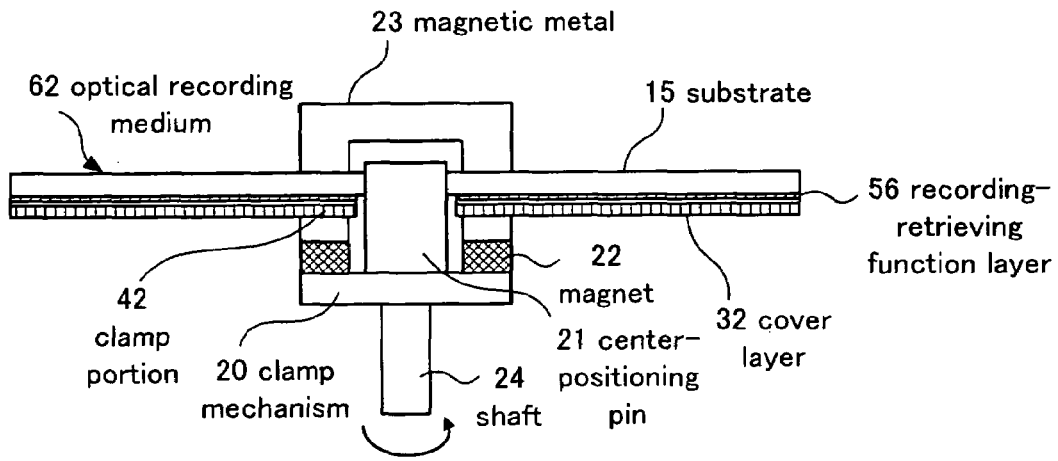
FIG. 6B is a view showing an optical recording medium in Comparative Example 2 attached to a clamp device.

FIG. 6B is a view showing the optical recording medium 62 manufactured in Comparative Example 2 and attached to a clamp mechanism 20.

The optical recording medium 62 comprises a polycarbonate substrate 15, a recording-retrieving function layer 56, and a cover layer 32 including a clamp portion 42, and is held in the clamp mechanism 20. The recording-retrieving function layer 56 was formed by performing an operation similar to that of Example 1.

The cover layer 32 including the clamp portion 42 was manufactured as follows. First, a conical stainless-steel mask having a diameter of 23.8 mm and a slope of 10 degrees was placed at the center of a substrate 15 on which the recording-retrieving function layer 56 was deposited. Then, after a precursor of photocurable resin was dropped on the mask, the substrate 15 was rotated at 1500 rpm, whereby a uniform layer which was made of the precursor of the photocurable resin and which had a thickness of 100 μm was formed on the substrate 15. Subsequently, after the mask was removed, the layer made of the precursor of the photocurable resin was irradiated with a high pressure mercury lamp having a wavelength of 365 nm and an intensity of 200 mW/cm$^2$ for 5 seconds to be cured, and thus the cover layer 32 including the clamp portion 42 as one body was formed. The curing reaction was caused in a nitrogen gas atmosphere, and thus the curing inhibition of oxygen was prevented. As the photocurable resin, radical polymerization-type acrylate resin was used. The viscosity of the precursor of the photocurable resin was made to be approximately 3,000 mPa·s. It is noted that the used precursor of the photocurable resin was the same as that of Example 1 (trade name: DIABEAM (trademark), manufactured by Mitsubishi Rayon Co., Ltd.).

Film Thickness Measurement of Optical Recording Medium

The result of measuring, by an operation similar to that of Example 1, the film thickness of the cover layer 32 including the clamp portion 42 formed in the optical recording medium 62 is shown in Table 3. As shown in Table 3, it can be seen that variations in the film thickness are particularly large in the clamp portion 42 compared to those of Example 1.

TABLE 3

| Film Thickness Measurement Position | Diameter (mm) | Film Thickness (μm) |
|---|---|---|
| Cover Layer | 120-34 | 100 ± 3 |
| Clamp Portion | 34-23.8 | 100 ± 18 |
| Substrate Surface | 23.8-15 | — |

Axial Runout Properies of Optical Recording Medium

As the result of measuring the axial runout of the optical recording medium 62 thus formed at the portion in which the circumferential radius was 58 mm similarly to Example 1, the displacement for one cycle was 115 μm. Thus, the amount of axial runout increased compared to that in the case of Example 1. The cause of the increase in the amount of axial runout is considered to be that the liquid of the precursor of the photocurable resin nonuniformly spreads at the edge of the periphery of the mask during spin coating, that the edge of the uncured precursor of the photocurable resin is distorted when the mask is removed after the precursor of the photocurable resin has been spin-coated, or the like. This inhibits the clamp portion 42 from coming into uniform contact with a rotation mechanism.

Focus Servo Properties of Optical Recording Medium

Focus servo noise due to variations in the film thickness of the cover layer 32 of the optical recording medium 62 thus formed was evaluated similarly to Example 1. As a result, the maximum value of normalized focus noise in a specific track at a radius of 55 mm was 35%.

Example 2

An optical recording medium having a form different from that in the case of Example 1 was prepared in accordance with the following procedure.

Figure 8:
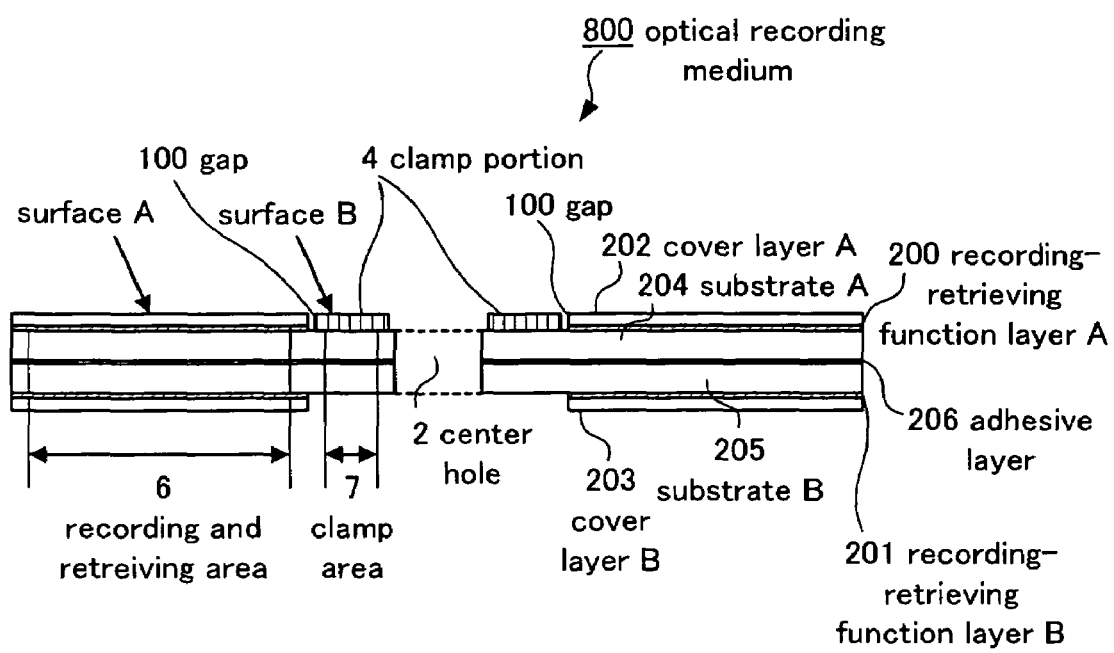
FIG. 8 is a view for explaining a third embodiment of an optical recording medium to which the embodiment is applied.

FIG. 8 is a view for explaining a third embodiment of an optical recording medium to which the present embodiment is applied. In FIG. 8, an optical recording medium 800 provided with a clamp portion as a separate entity from a cover layer is shown. The same components as those of the aforementioned optical recording medium 10 shown in FIG. 1A are denoted by the same reference numerals. The optical recording medium 800 comprises: two substrates of a substrate A 204 and a substrate B 205 in which center holes 2 are opened at the respective centers; a recording-retrieving function layer A 200 and a recording-retrieving function layer B 201 which are respectively formed on the substrate A 204 and the substrate B 205 and in which recording and/or retrieving of information signals is performed by use of irradiated light; a cover layer A 202 and a cover layer B 203 respectively formed on the recording-retrieving function layer A 200 and the recording-retrieving function layer B 201; a clamp portion 4 provided in a region which is around the center hole 2 and in which the cover layer A 202 is not formed; and an adhesive layer 206 for adhering the substrate A 204 and the substrate B 205. It is noted that a gap 100 is provided between the clamp portion 4 and the cover layer A 202.

Step of Forming Substrate

A substrate A 204 and a substrate B 205 which are made of polycarbonate and each of which has a diameter of 130 mm, a thickness of 0.6 mm, and a groove for tracking previously formed at a track pitch of 0.32 μm, were prepared. It is noted that the groove width was approximately 50% of the track pitch, and that the groove depth was 40 to 50 nm. Moreover, the rotation directions of tracks in the substrate A 204 and the substrate B 205 are opposite to each other.

Next, as rewritable media, a recording-retrieving function layer A 200 and a recording-retrieving function layer B 201 having layer configurations described below were formed on the substrate A 204 and the substrate B 205, respectively. The recording-retrieving function layer A 200 and the recording-retrieving function layer B 201 are first surface-type MAMMOS films of a type in which laser light is irradiated to a recording surface not through a substrate. That is, each of the first surface-type MAMMOS films has a configuration in which a heat sink layer, a recording auxiliary layer, a recording layer, a trigger layer, a reproduction layer, and a dielectric layer are sequentially stacked on the substrate A 204 or the substrate B 205.

The heat sink layer is formed by use of AlTiSi, and adjusts the thermal sensitivity of the medium in recording and reproduction. The recording auxiliary layer is a magnetic layer formed by use of GdFeCo with in-plane magnetization, and functions so that a recording magnetic domain is formed in the recording layer by a slight modulated magnetic field. The recording layer is formed by use of TbFeCo having transition metal-dominated perpendicular magnetization from room temperature to Curie temperature, and information is recorded as magnetization information therein. The trigger layer is formed by use of TbFe, and is a perpendicularly magnetized film having Curie point at 140° C. It is noted that the reproduction layer and the recording layer are formed so as to establish exchange coupling at temperatures equal to or lower than 140° C. The reproduction layer including first and second reproduction layers is formed by use of GdFeCo, and is a perpendicularly magnetized film showing rare earth metal-dominant ferrimagnetism from room temperature to Curie temperature. Further, in the reproduction layer, a magnetic domain transferred from the recording layer is magnified. The dielectric layer is formed by use of SiN, and has the function of causing a light beam for reproduction to multiply interfere in the dielectric layer and effectively increasing a Kerr rotation angle to be detected.

The heat sink layer, the recording auxiliary layer, the recording layer, the trigger layer, the reproduction layer, and the dielectric layer were formed by use of a predetermined sputtering apparatus (not shown) under the following conditions, respectively. That is, an enhancement layer was formed to have a film thickness of 35 mm by use of Si as a target material in an $Ar+N_2$ atmosphere. For the reproduction layer including the first and second reproduction layers, co-sputtering was performed using simple Gd, Fe, and Co as target materials. When the co-sputtering was performed, a film composition was adjusted by controlling the ratio of powers to be supplied to the respective targets. For example, in the case of Gd, the supplied power for sputtering was decreased as the film thickness increased; in the cases of Fe and Co, the supplied power for sputtering was increased as the film thickness increased. The reproduction layer is a perpendicularly magnetized film, and the film composition of the reproduction layer is adjusted so that Curie temperature becomes approximately 240° C. and that compensation temperature becomes Curie temperature or more. The film thickness of the first reproduction layer is 25 nm, and that of the second reproduction layer is 5 nm.

For the trigger layer, co-sputtering was performed using simple Tb and Fe as target materials. The reproduction layer is a perpendicularly magnetized film, and the film composition thereof is adjusted so that Curie temperature becomes approximately 140° C. and that compensation temperature becomes room temperature or less. The film thickness of the trigger layer is 10 nm. For the recording layer, co-sputtering was performed using simple Tb, Fe, and Co as target materials. The film composition of the reproduction layer is adjusted so that Curie temperature becomes approximately 250° C., that compensation temperature becomes approximately 25° C., and that the film thickness becomes 60 nm. For the recording auxiliary layer, co-sputtering was performed using simple Gd, Fe, and Co as target materials. The film composition of the reproduction layer is adjusted so that Curie temperature becomes approximately 270° C. and that the film thickness becomes 10 nm. For the heat sink layer, co-sputtering was performed using Al—Ti alloy and simple Si as target materials. The film thickness of the heat sink layer is 40 nm.

Step of Forming Cover Layer

First, a conical stainless mask having a diameter of 35 mm and a slope of 10 degrees was placed at the center of a substrate A 204 on which a recording-retrieving function layer A 200 was stacked. Then, after a precursor of photocurable resin was dropped on the mask, the substrate A 204 was rotated at 2000 rpm, whereby a uniform layer which was made of the precursor of the photocurable resin and which had a thickness of 15 µm was formed on the substrate A 204. Subsequently, after the mask was removed, the layer made of the precursor of the photocurable resin was irradiated with a high pressure mercury lamp having a wavelength of 365 nm and an intensity of 200 mw/cm² for 5 seconds to be cured, and thus a cover layer A 202 was formed. The curing reaction was caused in a nitrogen gas atmosphere, and thus the curing inhibition of oxygen was prevented. As the photocurable resin, radical polymerization-type acrylate resin (trade name: DAICURE CLEAR (trademark), manufactured by Dainippon Ink and Chemicals, Inc.) was used. The viscosity of the precursor of the photocurable resin was approximately 700 mPa·s. Next, a similar operation was performed, thereby a cover layer B 203 was formed, in which a uniform precursor of photocurable resin having a thickness of 15 µm is cured on substrate B 205 having a recording-retrieving function layer B 201 stacked thereon.

Step of Adhering Disks

Subsequently, a substrate A 200 and a substrate B 201 are adhered by use of adhesive. As the adhesive, cationic polymerization hardening-type delayed-action adhesive (trade name: DAICURE CLEAR (trademark), manufactured by Dainippon Ink and Chemicals, Inc.) was used. First, the adhesive was dropped on the inner circumference of an adhesive surface of the substrate A 200, and the substrate A 200 was rotated at 300 rpm, whereby a uniform film which was made of a precursor of photocurable resin and which had a thickness of 8 µm was formed on the adhesive surface. Next, the uniform film made of the precursor of the photocurable resin was irradiated with a high pressure mercury lamp having a wavelength of 365 nm and an intensity of 200 mw/cm² for 5 seconds. Then, the adhesive surface of the substrate B 201 was pressed against the uniform film made of the precursor of the photocurable resin, and the film made of the precursor of the photocurable resin was cured.

Step of Forming Clamp

Next, pressure sensitive adhesive (adhesive layer) having a thickness of 3 µm was formed on a SUS plate having a thickness of 12 µm, and thus a plate having a total thickness of 15 µm was obtained. Then, this plate was stamped into the shape of a ring having an inner diameter of 23.8 mm and an outer diameter of 34 mm to form a plate having the shape of a ring. Subsequently, with reference to a center hole 2 of substrate A 204, the ring-shaped plate obtained by stamping was adhered to the surface of substrate A 204, and thus a clamp portion 4 was formed.

Film Thickness Measurement of Optical Recording Medium

The film thicknesses of the cover layer A 202, the cover layer B 203, and the clamp portion 4 were measured by a method similar to that of Example 1. The results are shown in Table 4.

TABLE 4

| Film Thickness Measurement Position | Diameter (mm) | Film Thickness (µm) |
| --- | --- | --- |
| Cover Layer | 130-36 | 15 ± 1.2 |
| Cover Layer | 36-35 | 15 ± 10 |
| Substrate Surface | 35-34 | — |
| Clamp Portion | 34-23.8 | 15 ± 2 |
| Substrate Surface | 23.8-15 | — |

Referring to the results shown in Table 4, the step height between the portion of the cover layer A 202 in which the diameter is 130 to 36 mm and the clamp portion 4 is approximately 10 µm, and the step height between the portion of the cover layer A 202 in which the diameter is 36 to 35 mm and the clamp portion 4 is approximately 2 µm. It can be seen that the step height between the cover layer A 202 and the clamp portion 4 is very small in all film thickness measurement positions.

Moreover, as the result of measuring the transmittances of the cover layer A 202 and the cover layer B 203, the axial runout properties, and focus servo properties of the optical recording medium 800 similarly to Example 1, favorable properties were obtained. Furthermore, by using the SUS plate for the clamp portion 4 allowed stable recording and reproduction without damaging the disk even in rotation at a rotational speed of more than 10000 rpm. The present invention has been described in detail with reference to specific embodiments, but it is apparent to those skilled in the art that various changes and modifications are possible without departing from the concept and scope of the present invention. The present application is based on a Japanese Patent Application (2003-299089) filed on Aug. 22, 2003, and the entire disclosure thereof is hereby included by reference.

What is claimed is:

1. An optical recording medium comprising:
   a substrate;
   a recording-retrieving function layer formed on the substrate, the recording-retrieving function layer being provided for recording and/or retrieving information signals using irradiated light;

a cover layer formed on the recording-retrieving function layer; and a clamp portion;

wherein:

the clamp portion is formed on a surface of the optical recording medium where the cover layer is not formed; and the clamp portion is a formed body separately provided on the substrate or on the recording-retrieving function layer.

2. The optical recording medium according to claim 1, wherein:

the substrate has a plane ring shape;

the recording-retrieving function layer has an inner diameter larger than an inner diameter of the substrate, and an outer diameter smaller than an outer diameter of the substrate;

the cover layer has an inner diameter smaller than the inner diameter of the recording-retrieving function layer, and an outer diameter approximately equal to the outer diameter of the substrate; and the clamp portion has an inner diameter approximately equal to the inner diameter of the substrate or an inner diameter larger than the inner diameter of the substrate, and an outer diameter approximately equal to the inner diameter of the cover layer or an outer diameter smaller than the inner diameter of the cover layer.

3. The optical recording medium according to claim 1, wherein the clamp portion is formed of thermoplastic resin, and the cover layer is formed of photocurable resin.

4. The optical recording medium according to claim 1, wherein a step height between a surface of the clamp portion and a surface of the cover layer is within a range of ±0.05 mm.

5. The optical recording medium according to claim 1, wherein the clamp portion comprises:

a sheet layer for holding the optical recording medium, and contacting an external device; and an adhesive layer for adhering the sheet layer to any one of the substrate and the recording-retrieving function layer.

6. The optical recording medium according to claim 1, wherein axial runout measured on a surface of the recording-retrieving function layer when the optical recording medium is rotated while being held and fixed by the clamp portion is 100 µm or less.

7. The optical recording medium according to claim 1, wherein the cover layer is transparent to a light used for recording and/or retrieving of information signals, and the light passes through the cover layer to be irradiated to the recording-retrieving function layer.

8. The optical recording medium according to claim 1, wherein the clamp portion is formed of a metal plate.

9. The optical recording medium according to claim 1, wherein the substrate is provided with a center hole at a center thereof, and the clamp portion has an inner diameter larger than a diameter of the center hole and an outer diameter smaller than an inner diameter of the cover layer.

* * * * *